US012613964B2

(12) United States Patent
Gupta et al.

(10) Patent No.: US 12,613,964 B2
(45) Date of Patent: Apr. 28, 2026

(54) SYSTEM AND METHOD FOR PREVENTING AND MITIGATING MALICIOUS PROCESSES BY ANALYZING LIVE DATA

(71) Applicant: THALES DIS CPL USA, INC, Austin, TX (US)

(72) Inventors: Rajesh Gupta, San Jose, CA (US); Russel McDonald, Pflugeville, TX (US)

(73) Assignee: THALES DIS CPL USA, INC., Austin, TX (US)

( * ) Notice: Subject to any disclaimer, the term of this patent is extended or adjusted under 35 U.S.C. 154(b) by 205 days.

(21) Appl. No.: 18/522,449

(22) Filed: Nov. 29, 2023

(65) Prior Publication Data

US 2025/0173437 A1 May 29, 2025

(51) Int. Cl.
*G06F 21/55* (2013.01)
*G06F 21/56* (2013.01)

(52) U.S. Cl.
CPC .......... *G06F 21/566* (2013.01); *G06F 21/565* (2013.01)

(58) Field of Classification Search
CPC ...... G06F 21/566; G06F 21/565; G06F 21/55; G06F 21/56
See application file for complete search history.

(56) References Cited

U.S. PATENT DOCUMENTS

| | | | | |
|---|---|---|---|---|
| 12,423,411 | B2 * | 9/2025 | Strogov | G06F 21/53 |
| 2018/0268137 | A1 * | 9/2018 | Andersson | H04L 63/0245 |
| 2018/0293176 | A1 * | 10/2018 | Borlick | G06F 21/55 |
| 2019/0005235 | A1 * | 1/2019 | Klonowski | G06F 21/6218 |
| 2019/0228153 | A1 * | 7/2019 | Scaife | G06F 21/6218 |
| 2021/0026961 | A1 * | 1/2021 | Underwood | G06F 16/9027 |
| 2021/0243208 | A1 * | 8/2021 | Rubin | G06F 21/554 |

(Continued)

FOREIGN PATENT DOCUMENTS

| | | | | |
|---|---|---|---|---|
| KR | 101754720 B1 * | 7/2017 | | G06F 21/566 |
| KR | 102000369 B1 | 7/2019 | | |
| WO | 2022225508 A1 | 10/2022 | | |

OTHER PUBLICATIONS

International Search Report (PCT/ISA/210) and Written Opinion (PCT/ISA/237) mailed on Feb. 7, 2025 by the European Patent Office as the International Searching Authority for corresponding International Application No. PCT/US2024/056787—[18 pages].

(Continued)

*Primary Examiner* — Jayesh M Jhaveri

(57) ABSTRACT

A system (100) or method (500) for preventing or mitigating malicious processes in a computing environment having one or more processors (204) and memory (202) operatively coupled to the one or more processors can include computer instructions which when executed causes the one or more processors to perform certain operations. The operations can include intercepting (502) all file system input and output paths using a kernel driver (103), analyzing (504) for suspect behaviors in real time on data being processed through the input and output paths and data access patterns on a live system implemented in a kernel of an operating system for the computing environment, flagging (512) the data for any suspect behaviors, and preventing (514) further processing upon detection of the suspect behaviors.

13 Claims, 5 Drawing Sheets

100

(56) References Cited

U.S. PATENT DOCUMENTS

2025/0131088 A1 * 4/2025 Shahriar ............... G06F 21/565

OTHER PUBLICATIONS

Kharraz Amin et al: "Redemption: Real. Time Protection Against Ransomware at End· Hosts", Oct. 12, 2017 (Oct. 12, 2017), SAT 2015; 18th International Conference, Austin, TX, USA, Sep. 24-27, 2015; [Lecture Notes in Computer Science; Lect.Notes Computer], Springer, Berlin, Heidelberg, pp. 98-119, XP047450502, ISBN: 978-3-540-74549-5; [retrieved on Oct. 12, 2017]; pp. 98-99; figure 1 pp. 102-103; pp. 105-107.
THALES—CipherTrust Transparent Encryption—https://www. thalestct.com/wp-content/uploads/2022/09/ciphertrust-transparent-encryption-tct-pb.pdf.
THALES—CipherTrust Data Security Platform—https://cpl. thalesgroup.com/sites/default/files/content/product_briefs/field_document/2023-06/ciphertrust-data-security-platform-pb.pdf.

* cited by examiner

300

400

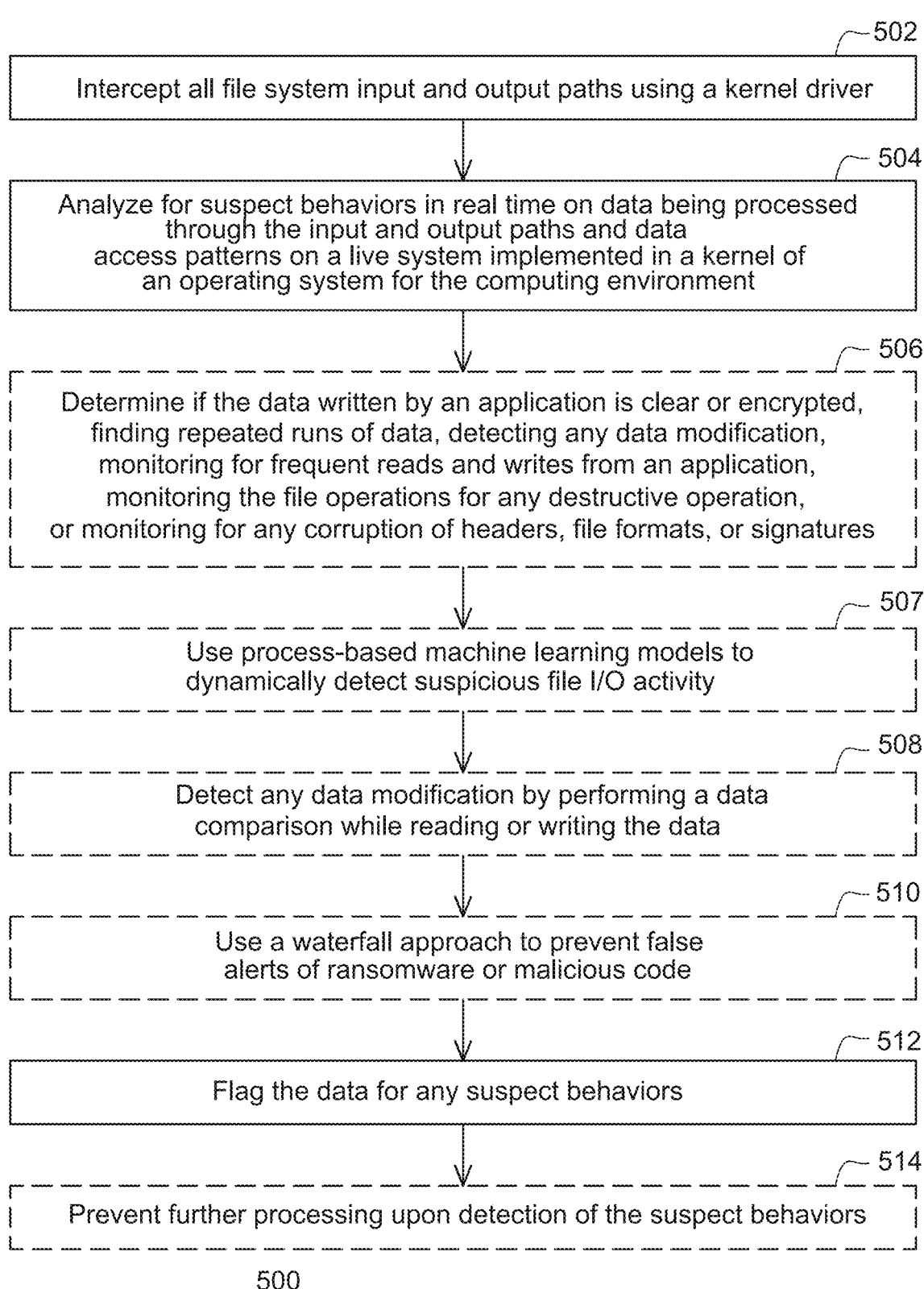

502

Intercept all file system input and output paths using a kernel driver

504

Analyze for suspect behaviors in real time on data being processed through the input and output paths and data access patterns on a live system implemented in a kernel of an operating system for the computing environment

506

Determine if the data written by an application is clear or encrypted, finding repeated runs of data, detecting any data modification, monitoring for frequent reads and writes from an application, monitoring the file operations for any destructive operation, or monitoring for any corruption of headers, file formats, or signatures

507

Use process-based machine learning models to dynamically detect suspicious file I/O activity

508

Detect any data modification by performing a data comparison while reading or writing the data

510

Use a waterfall approach to prevent false alerts of ransomware or malicious code

512

Flag the data for any suspect behaviors

514

Prevent further processing upon detection of the suspect behaviors

SYSTEM AND METHOD FOR PREVENTING AND MITIGATING MALICIOUS PROCESSES BY ANALYZING LIVE DATA

TECHNICAL FIELD

The present embodiments relate generally to systems and methods of detecting and preventing malicious processes. More particularly, the system and method relate to providing a system and method for preventing and mitigating malicious processing by analyzing live data efficiently.

BACKGROUND

Hacking vulnerabilities are discovered more often today. Cryptographic material, such as passwords, encryption keys, authentication information, and the like, may be cryptographically protected (e.g., encrypted) while being stored in non-volatile memory, for example, when the cryptographic material is not being used. To use the cryptographic material, the cryptographic material may be retrieved from the non-volatile memory, decrypted, and then stored in a volatile memory (e.g., a buffer, a cache, random access memory (RAM), etc.) in plaintext (e.g., unencrypted). The cryptographic material in the volatile memory may be used to perform cryptographic operations, such as authentication, encryption, authorization, signature generation, signature verification, etc.

However, the plaintext cryptographic material stored in the volatile memory continues to represent a vulnerability. In this regard, a malicious user (e.g., hacker) may use various tools to obtain the plaintext cryptographic material stored in the volatile memory. For example, the malicious user may gain access to a host and use tools to scan the volatile memory to obtain the plaintext cryptographic material. In another example, the malicious user may scan memory dumps and/or core dump files to retrieve the plaintext cryptographic material. In yet a further example, the malicious user may perform a cold boot attack to obtain the plaintext cryptographic material. Once the plaintext cryptographic material is obtained, the system may be compromised and the malicious user may obtain confidential and/or other secret information.

Another vulnerability has been the increasing use of ransomware. Ransomware accounts for 25% of all data breaches. Ransomware attacks can bring business operations to a grinding halt by blocking access to critical data until a ransom is paid. Ransomware is expected to strike businesses and individuals every 2 seconds by 2031.

Baseline security practices using perimeter controls such as next generation firewalls, secure email/web gateways and focusing on closing vulnerability gaps alone have not been sufficient to prevent ransomware attacks. The main challenge facing Fortune 500 companies is to safe guard business critical data from being encrypted by unauthorized processes and users on endpoints and servers.

One attempted solution inefficiently seeks for specific signatures or text within a file that creates many false positive hits. Another inefficient solution collects logs from the system and analyzes such logs to detect the malicious operations after being infected and unfortunately such a solution is usually too late at preventing serious damage intended by the perpetrator of the ransomware or other malicious code.

All of the subject matter discussed in this Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

In some embodiments, a system for preventing or mitigating malicious processes in a computing environment can include one or more processors and memory operatively coupled to the one or more processors, where the memory includes computer instructions which when executed by the one or more processors causes the one or more processors to perform one or more operations. The operations can include intercepting all, or any, file system input and output paths using a kernel driver, and analyzing behaviors in real time on data being processed through the input and output paths and data access patterns on a live system implemented in a kernel of an operating system for the computing environment. The system can analyze for behaviors (such as suspect behaviors) by determining if the data written by an application is clear or encrypted, finding repeated runs of data, detecting any data modification, monitoring frequent reads and writes from an application, monitoring the file operations for any destructive operation, monitoring for any corruption of headers, file formats, or signatures, and flagging the data for any of the aforementioned behaviors. The method can further prevent further processing upon detection of the one or more aforementioned behaviors.

In some embodiments, the system determines if the data written by the application is clear or encrypted by using mathematical variance. Note that the variance can be not of the data itself, but of the difference of each byte value. In some embodiments, instead of looking for encrypted data, the system is looking for change of data where the system looks across files such as one file reading of clear data and then writing back out of high entropy data.

In some embodiments, the system finds repeated runs of data by using run-length compression where repeated sequence of byte values are found in high variance data.

In some embodiments, the system detects any data modification by performing a data comparison while reading or writing the data.

In some embodiments, the system analyzes in real time the data by performing byte value significant weighted frequency detection.

In some embodiments, the system monitors frequent reads and writes from the application and flags any deviation from the behavior.

In some embodiments, the system is further configured to detect and analyze patterns for excessive data access, monitor data movement for exfiltration, unauthorized encryption, or impersonation with malicious actions.

In some embodiments, the system further uses a waterfall approach to prevent false alerts of ransomware or other malicious code. The waterfall approach is good at preventing or even eliminating false alerts for ransomware or other malicious code by using a sensitivity adjusted threshold based on measurements accounting for clear writes and other factors.

In some embodiments a system for preventing or mitigating malicious processes in a computing environment can include a kernel driver implemented in a kernel of an operating system for the computing environment and one or more processors and memory operatively coupled to the one or more processors where the memory includes computer instructions which when executed by the one or more processors causes the one or more processors to perform certain operations. The operations can include intercepting all file system input and output paths using the kernel driver and analyzing behaviors (such as suspect behaviors) in real time on data being processed through the input and output paths and data access patterns on a live system implemented in the kernel of the operating system for the computing environment. In some embodiments, the analyzing can be done by way of the kernel driver for determining if the data written by an application is clear or encrypted, finding repeated runs of data, detecting any data modification, monitoring frequent reads and writes from an application, monitoring the file operations for any destructive operation, monitoring for any corruption of headers, file formats, or signatures, and flagging the data for any of the aforementioned behaviors. The method can also prevent further processing upon detection of the one or more aforementioned behaviors.

In some embodiments, the system further uses a waterfall approach to prevent false alerts of ransomware by maintaining entropy and benchmark heuristics of false hits of normal writes that appear encrypted, actual ransomware encrypted writes, and clear reads as part of a module for detected encrypted data (in writes) and by taking measurements of clear reads, clear writes, file deletes, and other measurements (such as encrypted Base64 encrypted data) to create a malice score, where a score exceeding a sensitivity adjusted threshold indicates the presence of ransomware. The sensitivity adjustment can be as a result of (for example) the measurements taken into account for clear writes.

In some embodiments, a method for preventing or mitigating malicious processes in a computing environment having one or more processors and memory operatively coupled to the one or more processors where the memory includes computer instructions which when executed by the one or more processors causes the one or more processors to perform certain operations. The operations can include intercepting all file system input and output paths using a kernel driver, analyzing for suspect behaviors in real time on data being processed through the input and output paths and data access patterns on a live system implemented in a kernel of an operating system for the computing environment, flagging the data for any suspect behaviors, and preventing further processing upon detection of the suspect behaviors. In some embodiments the kernel driver performs the aforementioned steps.

In some embodiments, the method analyzes for suspect behaviors by determining if the data written by an application is clear or encrypted, finding repeated runs of data, detecting any data modification, monitoring for frequent reads and writes from an application, monitoring the file operations for any destructive operation, or monitoring for any corruption of headers, file formats, or signatures.

In some embodiments, the method detects any data modification by performing a data comparison while reading or writing the data.

In some embodiments, the method further uses a waterfall approach to prevent false alerts of ransomware or malicious code.

In some embodiments, the method further uses a waterfall approach to prevent false alerts of ransomware by maintaining entropy and benchmark heuristics of false hits of normal writes that appear encrypted, actual ransomware encrypted writes, and clear reads as part of a module for detected encrypted data in writes and by taking measurements of clear reads, clear writes, file deletes, and other measurements to create a malice score, wherein a score exceeding a sensitivity adjusted threshold indicates the presence of ransomware.

BRIEF DESCRIPTION OF THE DRAWINGS

The accompanying drawings, which are incorporated in and constitute a part of this description, illustrate embodiments consistent with the embodiments and, together with the description, serve to explain the principles of the embodiments.

FIG. 5 is a flow chart illustrating a method for preventing and mitigating malicious processes by analyzing live data in accordance with the embodiments.

Specific embodiments have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments. Instead, they are merely examples of systems, apparatuses and methods consistent with aspects related to the embodiments as recited in the appended claims.

Figure 1:
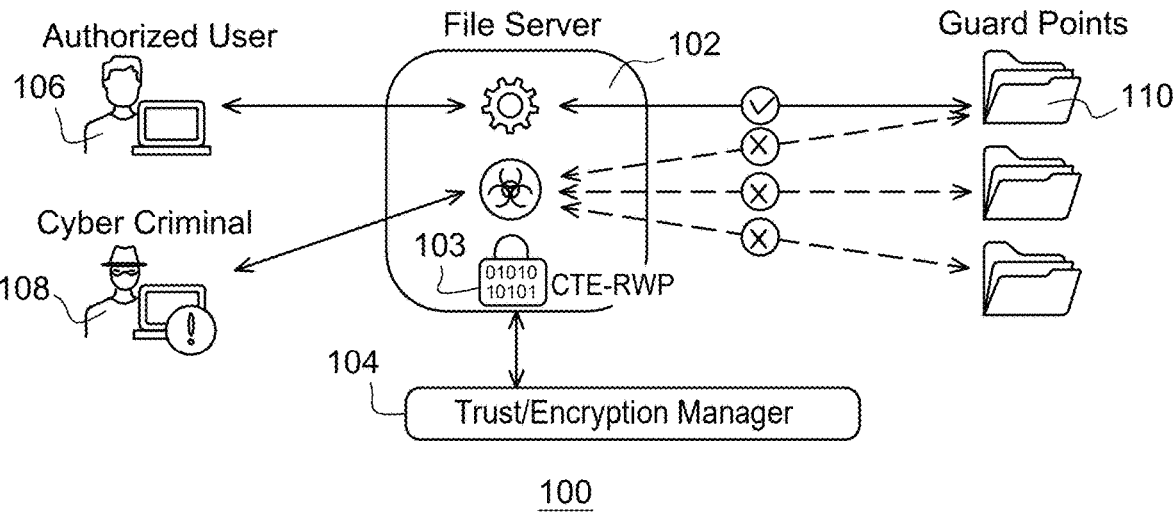
FIG. 1 illustrates a block diagram and flow of a system for preventing or mitigating malicious processes by analyzing live data in accordance with the embodiments.

In some embodiments with reference to the system 100 of FIG. 1, the systems and methods herein provide for Ransomware (and other malicious code) protection in a non-intrusive way of protecting files/folders 110. The embodiments herein watch for abnormal I/O activity on files hosting data and in some embodiments, business critical data on a per process basis. It allows administrators to alert/block suspicious activity before ransomware can take hold of the endpoints/servers 102 belonging to an entity.

Existing systems are inefficient and typically use a signature based approach. Some solutions look for specific signatures, text or other indicator inside the file. Some solutions looks for specific Ransomware texts. In yet other solutions logs are collected from the system to monitor the activity and analyze these logs to detect the malicious operations. In yet other existing solutions, a system collects the data and sends it to other servers for analysis. This technique is good for forensic analysis once the attack is over, but it doesn't protect the customer's data on live systems.

The embodiments provide transparent data protection by continuously enforcing ransomware protection per volume with minimal configuration and no modification to any applications on the endpoint/server 102. It continuously monitors abnormal file activity caused by ransomware infected processes, and alerts/blocks when such an activity is detected.

Since the data protection embodiments can be embodied as a stand alone module 104, it enables administrators to start with ransomware protection alone, without setting up restrictive access control and encryption policies on a per file/folder basis.

In some embodiments, the system (100) and method (500) uses process-based machine learning models to dynamically detect suspicious file I/O activity. It identifies and alerts or blocks ransomware from cyber criminals 108 on the endpoints/servers 102. Approved processes by authorized users 106 can be added to a trusted list to bypass monitoring in certain embodiments.

The embodiments herein provide an adequate level of ransomware detection, without configuring detailed access control policies at a file/folder level on each endpoint/server. Combined with an encryption engine, administrators can additionally apply finer-grained access control and encryption. Fine-grained Access Control defines who (user/group) has rights to encrypt/decrypt/read/write or list-directory where business critical data resides and places strict access control policies around backup processes, including encrypting backups to prevent data exfilteration. The access control can also provide guard point level trusted list of files (binaries) that are approved to access and encrypt/decrypt protected folders including signature checks on trusted applications to ensure their integrity.

The embodiments herein enable detection and prevention of malicious processes from encrypting or destroying sensitive data and can stop exfiltration of sensitive data from internal or external threats. The system performs efficient and enhanced data analysis and protection for sensitive data by effectively understanding the process behavior commonly known in the malicious processes and identifying and blocking such processes before they are executed on the sensitive data. This is more efficient that having to rely on a database with signatures that need to be constantly updated.

Briefly, an attack vector is a method of achieving unauthorized network access to launch a cyber-attack. Attack vectors allow cybercriminals to exploit system vulnerabilities to gain access to sensitive data, personally identifiable information (PII), and other valuable information accessible after a data breach. Common attack vectors include ransomware, malware, viruses, email attachments, web pages, pop-ups, instant messages, text messages, and social engineering. Attackers also attempt to exploit unpatched or zero-day vulnerabilities, for example, listed on the dark web of common vulnerability exposures (CVE) listings.

Suspicious behaviors are indicative of both active attacker tactics and longer term passive nefarious attacks and infections, including, but not limited to, for example, ransomware activities associated with data modification, harvesting, exfiltration, file attribute alteration, system breaches or infiltrations. Examples, include data encryption, privilege escalation or de-escalation, modification of file attributes, introduction of new files, deletion of existing files, change in location of files, or other unusual system or network activity. Suspicious ransomware behaviors include, but are not limited to application processes associated with i) writing data in the clear or encrypted, ii) generating repeated runs of data, iii) reading, writing or modifying data at specific intervals or periods, and iv) destructive file operations, corrupting headers, file formats or signatures.

Existing systems inefficiently look at databases for matching with existing signatures. In some instances, this is done after analyzing logs after data processing. In many instances, analyzing logs will be too late to prevent the damage intended by the malicious cybercriminal.

Instead, the embodiments herein safeguard the sensitive data against ransomware attacks by analyzing the process IO and data access pattern efficiently on live data or in-line. In some embodiments, the system can run on data as a dispatch IRQ or interrupt request. In general, the code is written at a dispatch level. Such a system preferably has the ability to analyze various data formats or types, compressed data, de-duped data, and with minimal or even without any false positives. In some embodiments, the system and methods can protect against polymorphic Read/Write attacks without signature database matching.

In other words, the systems and methods herein collect and analyze the application data on a live system with efficiency and accuracy without affecting the application performance and functionality. Furthermore, such a system can provide a solution that is immune to any Advanced Persistent Threats (APT) or scripts.

The system can be used on different formats of data, whether encrypted or compressed or not. For example, the system can utilize the knowledge that most keys are length aligned, and more particularly, 16 bytes aligned. So anything that repeats in a run that is evenly divisible by 16 could likely still be an encrypted block of data even though it repeats. This enables the easy analysis of WinZip files to determine if the file is clear versus two other cases, where it's a WinZip (compression) of encrypted data or it's a WinZip (compression) of clear data. In other words, you can have a WinZip compressed file that is then encrypted or an encrypted file that is then compressed. Such files can be distinguished by looking at the WinZip compression screen itself and see if itself has repeated sequences to determine if its clear data. WinZip will also put a clear header before each run sequence of data, which the detection system discards as too low of entropy for any compressed stream. The technique above also applies to Base64 data.

Figure 2:
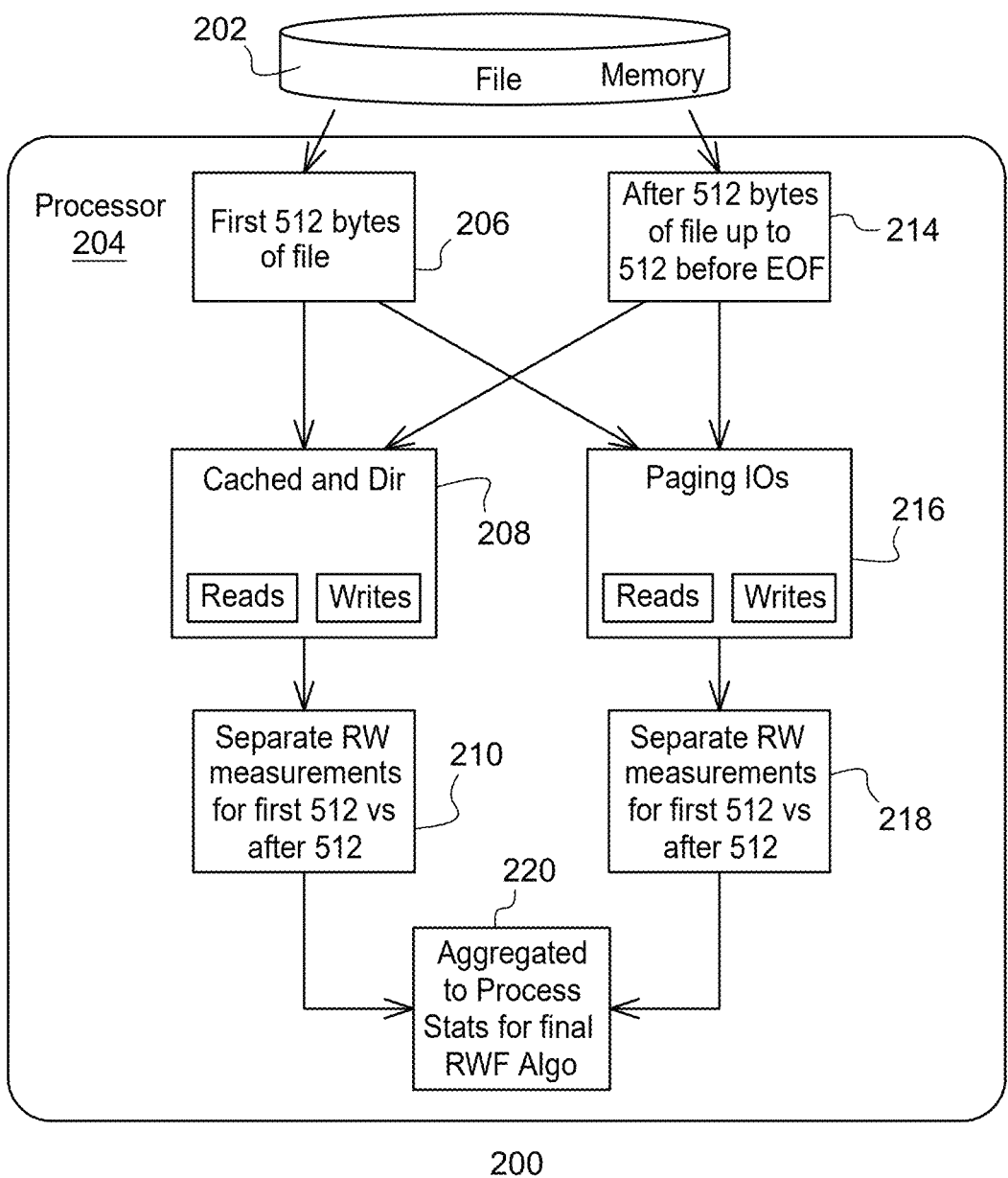
FIG. 2 illustrates another block diagram and flow of a system for preventing or mitigating malicious processes by analyzing live data in accordance with the embodiments.

In some embodiments, with further reference to a method 200 as illustrated in FIG. 2, limited read and writes from a file in memory 202 can be initially analyzed by a processor 204. The data can be viewed in multiple slices. In some embodiments, the system can look at the 1st 512 bytes and then all the data after the first 512 bytes. Part of this technique is intended to handle the situation where some ransomware will add their own headers which many of them do. It avoids the situation of falsely thinking that since the header is clear that the resultant writing will provide clear data.

Furthermore, the system must look beyond the 1st 512 bytes because some ransomware may start encrypting further down on the file like 3K down into the file. The system also needs to account for highly compressed files such as Gzips which have high entropy and they have tiny headers.

For small Gzips, even the run link compression doesn't find any repeated run sequence of data further into the data. Because of that, it is likely a small gzip will have no repeated runs, but the system can tell if it's being encrypted based on looking at the header that has been correlated using a benchmark technique.

For example with further reference to FIG. 2, the first 512 bytes of a file can be obtained at 206 and cached and directed as input and outputs at 208 and further measured and separated at 210. The measurements are aggregated and used to process statistics for a final ransomware algorithm at 220. Similarly, bytes of a file after the first 512 bytes up to 512 bytes before the end of file are obtained at 214 as paging IOs at 216 and the read and writes are separated for measurements at 218 for the first 512 bytes versus the subsequent measured 512 bytes prior to aggregation for statistics for the final ransomware algorithm at 220.

Figure 3:
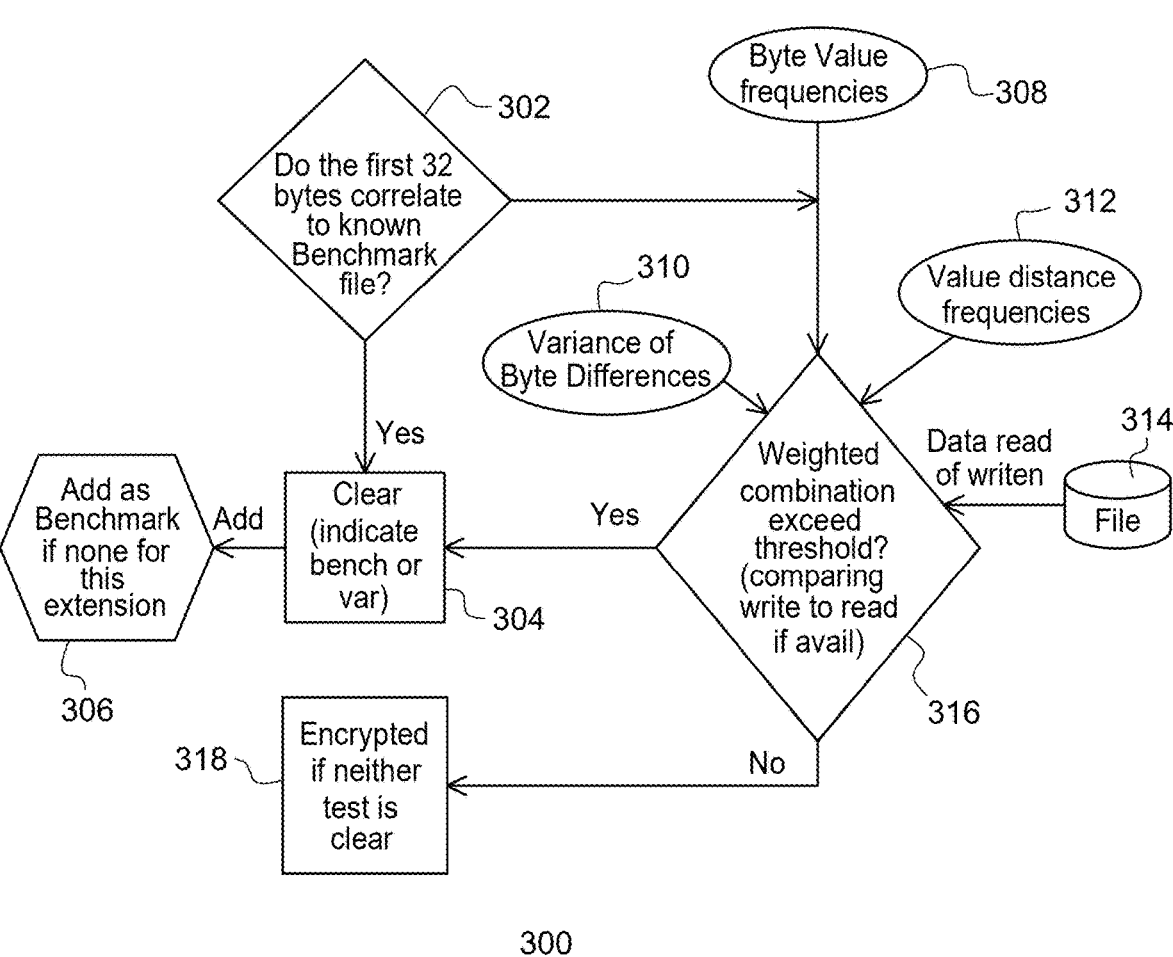
FIG. 3 illustrates a flow chart for a method using the system of FIG. 2 in accordance with the embodiments.

With reference to FIG. 3, a method 300 in accordance with the embodiments further includes looking at entropy and benchmark heuristics for the first or initial bytes (such as first 512 bytes) per file. The method 300 will take into account various factors or inputs. If the first 32 bytes, for example, correlate to a known benchmark file, the method 300 can clear the first 32 bytes at 304 indicating them as either as a benchmark or variation and add them to the benchmark (file or database) at 306 if no benchmark already exists for this extension. The method at decision block 316 can further determine if a weighted combination exceeds a threshold (by comparing write to read files if available) from a file source 314 of data reads or data writes (or both). The decision block 316 can also take into account byte value frequencies 308, value distance frequencies 312, and variance of byte differences 310 before determining if the weighted combination exceeds the threshold for the sampled bytes or file portions. If the weighted combination exceed the threshold at 316, then the byte or file is cleared at 304 as discussed above. If the weighted combination fails to exceed the threshold at 316, then the file is flagged as encrypted.

In some embodiments, the value frequencies at 308 includes performing run length compression analysis, detecting repeated runs of data which indicates clear data. And in some embodiments, the value distance frequencies at 312 includes tracking the maximum distance between any two adjacent runs across all reads to compare to the same maximum distance that is detected across all writes. Ransomware which only encrypts partial chunks in the middle of a file will significantly increase the maximum distance between runs during the writes as compared to the maximum distance between runs that occurred during the reads.

Figure 4:
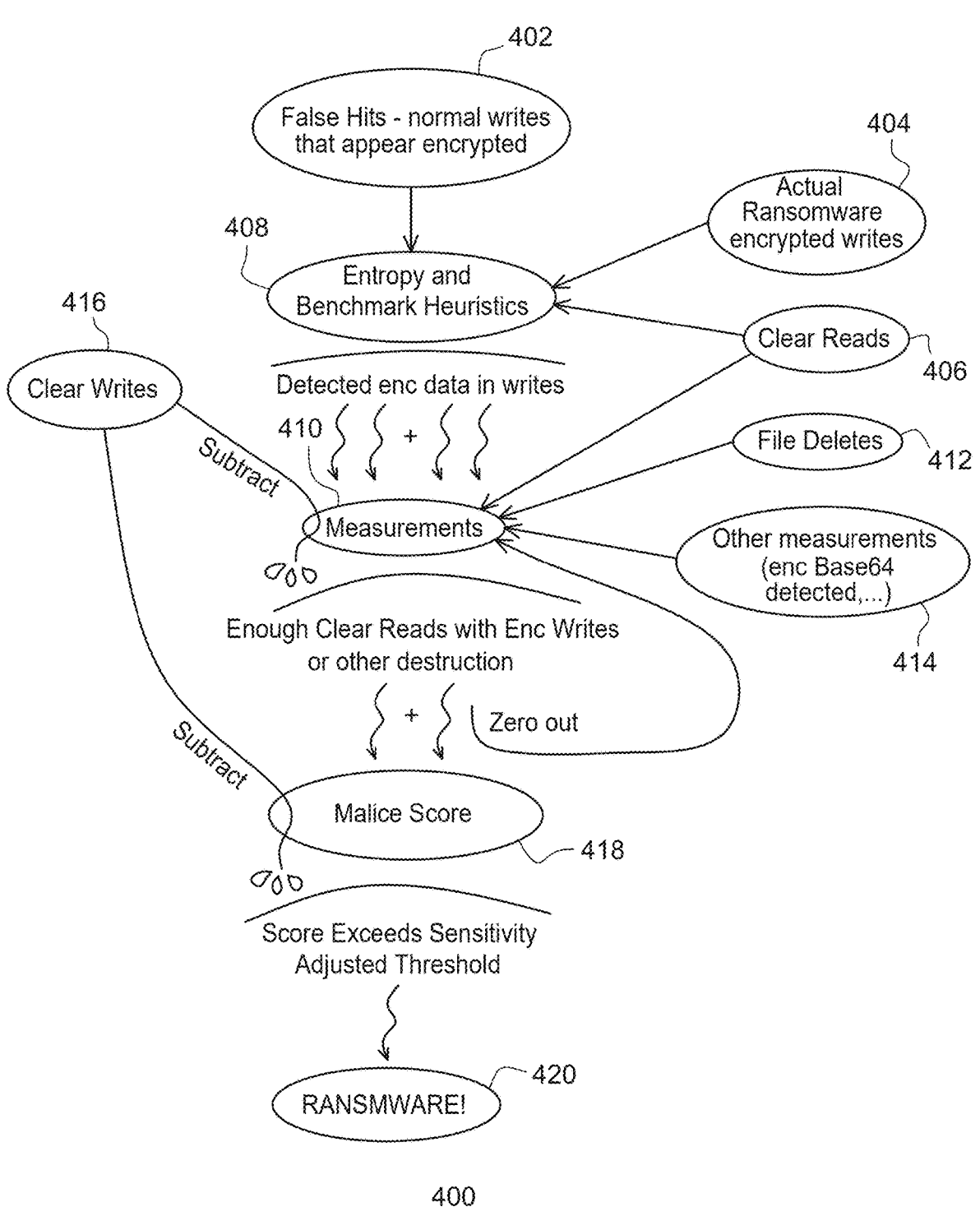
FIG. 4 illustrates a flow chart of a method using a waterfall approach to prevent false alerts in accordance with the embodiments.

In some embodiments, the system or method using a "waterfall" approach to prevent false alters on a per process basis. Although the embodiment shown in the approach 400 of FIG. 4 prevents false alerts for ransomware, the same technique can be used to detecting other malicious codes or processes. More particularly, the approach 400 prevents false alerts of ransomware by maintaining entropy and benchmark heuristics (408) of false hits of normal writes that appear encrypted (402), actual ransomware encrypted writes (404), and clear reads (406) as part of a module 408 for detected encrypted data (in writes). By further taking sufficient measurements (410) of clear reads (406), clear writes (416), file deletes (412), and other measurements (414) (such as encrypted Base 64 data detections) to create a malice score 418, where a score exceeding a sensitivity adjusted threshold indicates the presence of ransomware (420) or alternatively other malicious code The waterfall approach 400 takes into account an accrual of error or errors over time that might be over seconds, hours, or days for example. In this technique, the errors will finally bubble up until a threshold hits and a problems appears to exist when it is just really an accrual error. The waterfall approach eliminates the accrual error problem. So looking at the the entropy and benchmark heuristics 408 in FIG. 4, the reads and the writes coming in can have some being normal writes but then others can have ransomware coming in. So as the system detects the ransomware, the system detects the change from clear.

The next level for measurements at 410 has encrypted high entropy across files. So the system adds up different counters when those measurements cumulatively or altogether hit certain thresholds they then spill over into the next level and then the system zeros out certain measurements (such as those due to clear writes) to reduce or eliminate false hits. In this manner, the behavior must repeat from scratch again and again to build up a sufficient malice score at the end of the waterfall.

If there is a false hit, the system can include a process exemption list. For example, when Firefox is caching HTTP, which is clear, and also HTTPS, which is encrypted. The system will be reading clear and writing encrypted for periods of time which may create a false hit. Again, in such instances, the particular process can be added to a process exemption list. Note, the system can also exempt paths as well particular processes.

As previously mentioned, the embodiments can be implemented in the kernel where a kernel driver intercepts all the File system IO paths. During read/writes IO requests, the kernel driver collects the data and runs through any number of the following algorithms and analysis:

(a) Uses mathematical Variance to determine if the data written by application is clear or encrypted (b) Run-length compression technique to find repeated runs of data, as well tracking the maximum distance between repeated runs that occurred during reads to compare to the same that occurred during writes.

(c) Repeated sequence of byte values in the high variance data (d) Performs the data comparison while reading/writing the data to detect any data modification (e) Byte value significant weighted frequency detection (f) Monitor frequent reads and writes (heavy data access) from an application. Monitor the behavior and flag any deviation (g) Monitor the file operations and ensure any destructive operation is being flagged and monitored (g) Understand the file formats and headers, if a process tries to corrupt the header/signature, it flags it.

Beside running the real time analysis on the data, the systems and methods herein can perform the following:

(a) Analyze application data access patterns; detect excessive data access, monitor data movement for exfiltration, unauthorized encryption, or impersonation with malicious actions (b) Monitor active processes (live analysis) rather than relying on a database of known ransomware file signatures. Understand the behavior and flag the application with malicious behavior (c) Detect and prevent any new Ransomwares without any changes in the algorithm (d) Detect sparse encryption (encrypting random blocks inside a file to make it unusable), file header destructions within a file and in-place encryption or encryption to a new file.

Referring to FIG. 5, a method 500 for preventing or mitigating malicious processes can include the operations of intercepting (502) all file system input and output paths using a kernel driver (103), analyzing (504) for suspect behaviors in real time on data being processed through the input and output paths and data access patterns on a live system implemented in a kernel of an operating system for the computing environment, flagging (512) the data for any suspect behaviors, and preventing (514) further processing upon detection of the suspect behaviors.

In some embodiments, the method analyzes for suspect behaviors by determining (506) if the data written by an application is clear or encrypted, finding repeated runs of data, detecting any data modification, monitoring for frequent reads and writes from an application, monitoring the file operations for any destructive operation, or monitoring for any corruption of headers, file formats, or signatures.

In some embodiment, the method uses at 507 process-based machine learning modules to dynamically detect suspicious file input/output (I/O) activity.

In some embodiments, the method detects at 508 any data modification by performing a data comparison while reading or writing the data.

In some embodiments, the method further uses a waterfall approach at 510 (see also 400 in FIG. 4) to prevent false alerts of ransomware or malicious code. In some embodiments, the waterfall approach (400) prevents false alerts of ransomware by maintaining entropy and benchmark heuristics (408) of false hits (402) of normal writes that appear encrypted, actual ransomware encrypted writes (404), and clear reads (406) as part of a module 408 for detected encrypted data (in writes) and further prevents false alerts by taking measurements (410) of clear reads (406), clear writes (416), file deletes (412), and other measurements (414) such as encrypted Base64 detections to create a malice score (418), where a score exceeding a sensitivity adjusted threshold indicates the presence of ransomware (420).

In summary, the methods and systems herein can run a live analysis on data being read or written by an application with great efficiency and with minimal or no false positives with accuracy. Although not necessarily limited to ransomware, embodiments are ideally suited for detecting ransomware activities such as excessive data access, exfiltration, encryption, data destructions or impersonation with malicious actions.

The systems and methods herein monitor active processes rather than relying on a database of known ransomware file signatures. Incredibly, the system can defend against ransomware even when the ransomware is already installed prior to this solution. In other words, the embodiments herein can detect ransomware that is lying in wait.

In some embodiments, the systems and methods can differentiate between BASE64 of clear data and BASE64 of encrypted data without BASE64 decoding. Similarly, the systems and methods can differentiate compressed data with high entropy value versus maliciously encrypted data without having to decompress the data. The data analysis in the embodiments can avoid "Zero day" Ransomware attacks since the method and systems do not rely on signatures.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for preventing or mitigating malicious processes in a computing environment, comprising:

one or more processors and memory operatively coupled to the one or more processors, wherein the memory includes computer instructions which when executed by the one or more processors causes the one or more processors to perform the operations of:

intercepting all file system input and output paths using a kernel driver;

analyzing behaviors in real time on data being processed through the input and output paths and data access patterns on a live system implemented in a kernel of an operating system for the computing environment by:

determining if the data written by an application is clear or encrypted;

finding repeated runs of data;

detecting any data modification;

monitoring frequent reads and writes from an application;

monitoring the file operations for any destructive operation;

monitoring for any corruption of headers, file formats, or signatures;

flagging the data for any of the aforementioned behaviors; and preventing further processing upon detection of the one or more aforementioned behaviors, wherein the system further uses a waterfall approach to prevent false alerts of ransomware by maintaining entropy and benchmark heuristics of false hits of normal writes that appear encrypted, actual ransomware encrypted writes, and clear reads as part of a module for detected encrypted data in writes.

2. The system of claim 1, wherein the system determines if the data written by the application is clear or encrypted by using mathematical variance of the difference of each byte value.

3. The system of claim 1, wherein the system finds repeated runs of data by using run-length compression where repeated sequence of byte values are found in high variance data.

4. The system of claim 1, wherein the system detects any data modification by performing a data comparison while reading or writing the data.

5. The system of claim 1, wherein the system analyzes in real time the data by performing byte value significant weighted frequency detection.

6. The system of claim 1, wherein the system monitors frequent reads and writes from the application and flags any deviation from the behavior and further uses process-based machine learning models to dynamically detect suspicious file I/O activity.

7. The system of claim 1, wherein the system is further configured to detect and analyze patterns for excessive data access, monitor data movement for exfiltration, unauthorized encryption, or impersonation with malicious actions.

8. The system of claim 1, wherein the waterfall approach prevent malicious code by taking measurements of clear reads, clear writes, file deletes, and other measurements to create a malice score, wherein a score exceeding a sensitivity adjusted threshold indicates the presence of ransomware.

9. A system for preventing or mitigating malicious processes in a computing environment, comprising:

one or more processors and memory operatively coupled to the one or more processors, wherein the memory includes computer instructions and a kernel driver of an operating system for the computing environment which when executed by the one or more processors causes the one or more processors to perform the operations of:

intercepting all file system input and output paths using the kernel driver;

analyzing behaviors in real time on data being processed through the input and output paths and data access patterns on a live system implemented in the kernel of the operating system for the computing environment by:

determining if the data written by an application is clear or encrypted;

finding repeated runs of data;

detecting any data modification;

monitoring frequent reads and writes from an application;

monitoring the file operations for any destructive operation;

monitoring for any corruption of headers, file formats, or signatures;

flagging the data for any of the aforementioned behaviors; and preventing further processing upon detection of the one or more aforementioned behaviors, wherein the system further uses a waterfall approach to prevent false alerts of ransomware by maintaining entropy and benchmark heuristics of false hits of normal writes that appear encrypted, actual ransomware encrypted writes, and clear reads as part of a module for detected encrypted data in writes and by taking measurements of clear reads, clear writes, file deletes, and other measurements to create a malice score, wherein a score exceeding a sensitivity adjusted threshold indicates the presence of ransomware.

10. A method for preventing or mitigating malicious processes in a computing environment having one or more processors and memory operatively coupled to the one or more processors, wherein the memory includes computer instructions which when executed by the one or more processors causes the one or more processors to perform the operations of:

intercepting all file system input and output paths using a kernel driver;

analyzing for suspect behaviors in real time on data being processed through the input and output paths and data access patterns on a live system implemented in a kernel of an operating system for the computing environment;

flagging the data for any suspect behaviors; and preventing further processing upon detection of the suspect behaviors, wherein the method further uses a waterfall approach to prevent false alerts of ransomware by maintaining entropy and benchmark heuristics of false hits of normal writes that appear encrypted, actual ransomware encrypted writes, and clear reads as part of a module for detected encrypted data in writes and by taking measurements of clear reads, clear writes, file deletes, and other measurements to create a malice score, wherein a score exceeding a sensitivity adjusted threshold indicates the presence of ransomware.

11. The method of claim 10, wherein the method analyzes for suspect behaviors by determining if the data written by an application is clear or encrypted, finding repeated runs of data, detecting any data modification, monitoring for frequent reads and writes from an application, monitoring the file operations for any destructive operation, or monitoring for any corruption of headers, file formats, or signatures.

12. The method of claim 10, wherein the method detects any data modification by performing a data comparison while reading or writing the data.

13. The method of claim 10, wherein the method further uses a waterfall approach to prevent false alerts of ransomware or malicious code.

* * * * *